No. 673,349. Patented Apr. 30, 1901.
W. T. WRIGHT.
PEA OR BEAN THRESHER.
(Application filed Mar. 11, 1899.)

(No Model.)

Witnesses

Inventor
W. T. Wright,
by
Attorneys

UNITED STATES PATENT OFFICE.

WILLIAM THOMAS WRIGHT, OF ELMSPRINGS, ARKANSAS, ASSIGNOR OF ONE-HALF TO J. A. WRIGHT, OF SAME PLACE.

PEA OR BEAN THRESHER.

SPECIFICATION forming part of Letters Patent No. 673,349, dated April 30, 1901.

Application filed March 11, 1899. Serial No. 708,746. (No model.)

*To all whom it may concern:*

Be it known that I, WILLIAM THOMAS WRIGHT, a citizen of the United States, residing at Elmsprings, in the county of Washington and State of Arkansas, have invented a new and useful Pea or Bean Thresher, of which the following is a specification.

My invention relates to machines for threshing and cleaning dry peas and beans, the object being to provide a simple and effective machine of this class which may be so economically made as to place it within the reach of every farmer.

My invention consists in the improved construction, arrangement, and combination of parts hereinafter fully described and afterward specifically pointed out in the appended claim.

In order to enable others skilled in the art to which my invention most nearly appertains to make and use the same, I will now proceed to describe its construction and operation in connection with the accompanying drawings, forming part hereof, in which—

Figure 1:
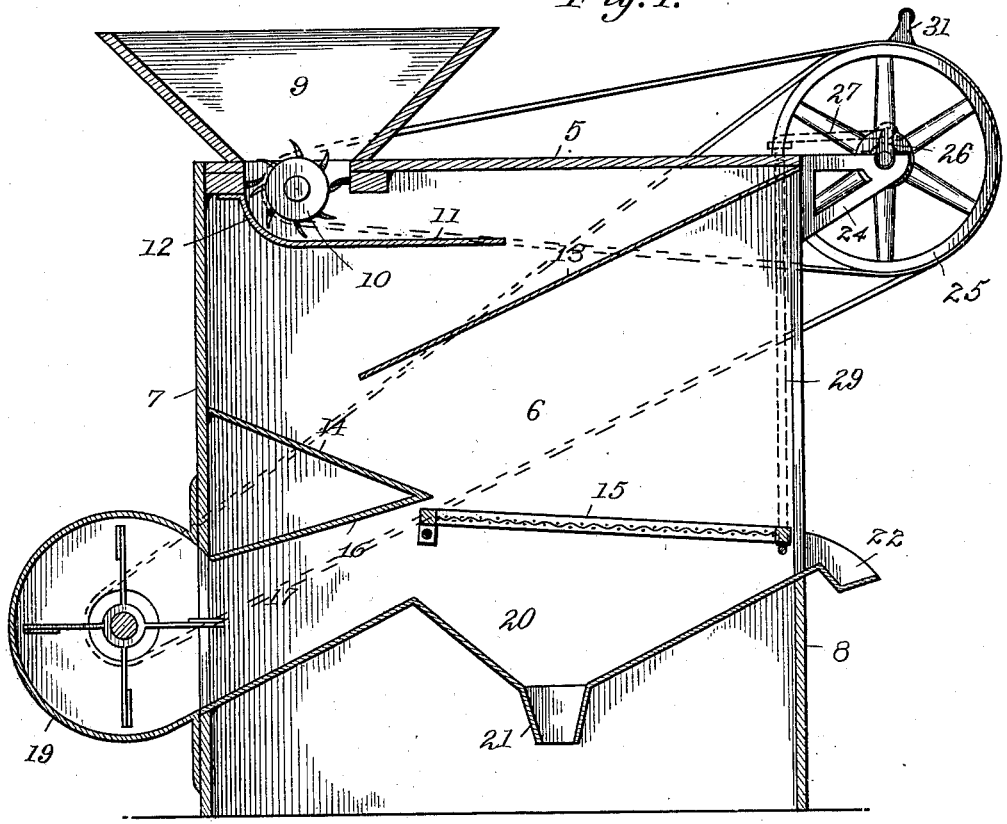
Figure 1:
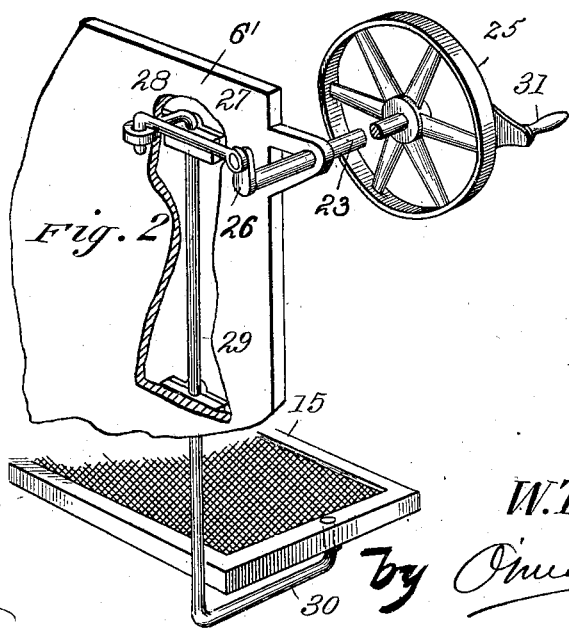

Figure 1 is a longitudinal vertical sectional view of a machine constructed in accordance with my invention. Fig. 2 is a broken perspective detail view illustrating the riddle-shaking mechanism.

Like numerals of reference mark the same parts wherever they occur in both figures of the drawings.

Referring to the drawings by numerals, 5 indicates the top, 6 one side, 6' the other side, and 7 and 8 the ends, of the body of the machine, said parts being arranged in the form of an inclosed box without a bottom. At one end of the machine is mounted a transverse hopper 9, discharging through the top 5 upon a threshing-cylinder 10, journaled in the sides, the broken hulls of peas and beans falling upon a horizontal partition 11, having a curved end 12 partially surrounding the cylinder.

13 is an inclined partition passing under the discharge end of the partition 11, so that the hulls and kernels will fall upon and roll or slide down it the more fully to separate them. 14 indicates an oppositely-inclined slideway or apron reaching under the discharge end of partition 13 to receive its contents and conduct them to and discharge them upon the shaking riddle or sieve 15, suspended in the body of the machine. The apron 14 is downwardly inclined and is braced and supported by an upwardly-inclined board or partition 16, which forms the top of the air-passage 17, leading inward to the under side of the riddle 15 from a rotary fan journaled in a cylindrical box 19, secured to the end 7 of the body of the machine.

19 indicates the bottom of the air-passage, which inclines upwardly and connects at its inner end with one side of a hopper 20, located under the riddle and discharging through a spout 21 in any suitable receptacle placed under the machine.

On a level with the end of the riddle 15 is a discharge-spout 22, by means of which the material above the riddle is discharged through the end 8 of the body, the upper end of which is open, into any suitable receptacle.

23 indicates a shaft journaled in brackets 24 at the top of end 8, which shaft carries a belt-pulley 25, engaging a pulley (not shown) on the shaft of the threshing-cylinder 10, by means of which the cylinder is driven, and the fan may be driven by a belt from shaft 23 or the cylinder-shaft. The shaft 23 also carries a crank-arm 26, connected by a link 27 to a crank-arm 28 at the top of a vertical shaft or rod 29, another arm 30 of said rod 29 connecting with the rear end of the riddle 15, the forward end of the riddle being supported in any ordinary manner, which forms no part of my invention and is not shown. The rod 29 will be suitably journaled in the body of the machine, and the shaft 23 may be turned by a crank-handle 31 in a hand-machine, or by a belt if it should be desired to operate the machine by power. The rod 29 is preferably formed from a rod of metal, the upper end of which is bent at an angle and provided with an eye for the reception of the link 27, and the lower end is bent in the opposite direction and is formed with an upwardly-projecting portion on which one end of the riddle is supported and by means of which it is operated. By constructing the rod in this manner it will be cheap and it can be supported by its upper end resting upon the bearing in which it is journaled and its lower end will sustain the weight of the riddle, thereby reducing the friction of the moving parts to a minimum.

The construction of my invention will be readily apparent from the foregoing description, and its operation is as follows: The dry peas or beans in their hulls being placed in the hopper 9 at the top of the machine, the threshing-cylinder 10 will break the hulls and push them off the inner end of the horizontal partition 11, from which they will fall upon the inclined partition or apron 13, thence upon the apron 14, which will conduct them to and discharge them upon the shaking-riddle 15. In their passage over aprons 13 and 14 the hulls, which are very brittle and fragile, will be further broken and separated from the kernels, so that when the riddle is reached they will be so disconnected that the upward blast of air through the passage 17 will blow the chaff and dust through the end 8 over the spout 22, while the kernels will pass through the riddle into the hopper 20 and be discharged through spout 21. The chaff will be discharged to some distance from the body of the machine, and any broken kernels which may pass out with the chaff will drop down vertically off spout 21 into any suitable receptacle placed there to receive them.

While I have illustrated and described what I consider to be the best means for carrying out my invention, I do not wish to be understood as limiting myself to the exact forms and constructions shown, as many slight changes and variations might suggest themselves to the ordinary mechanic which would be clearly included within the scope and limit of my invention.

Having thus fully described my invention, what I claim as new, and desire to secure by Letters Patent of the United States, is—

In a pea and bean thresher, the combination, with a box-frame provided with a cylinder and a fan, of a shaft journaled across one end thereof, one end of which is provided with means for operating it and the cylinder and the fan and the other end is provided with a crank-arm, a rod journaled vertically intermediate of its ends at one side of the frame, the upper end of which is bent at an angle and provided with an eye and the lower end is bent in the opposite direction and is provided with an upwardly-projecting portion, a link from the crank-arm to the eye, and a riddle supported at one end above the fan and having its other end pivotally mounted on said upwardly-projecting portion.

WILLIAM THOMAS WRIGHT.

Witnesses:
S. J. ROPER,
S. S. WEBSTER.